Patented Jan. 23, 1951

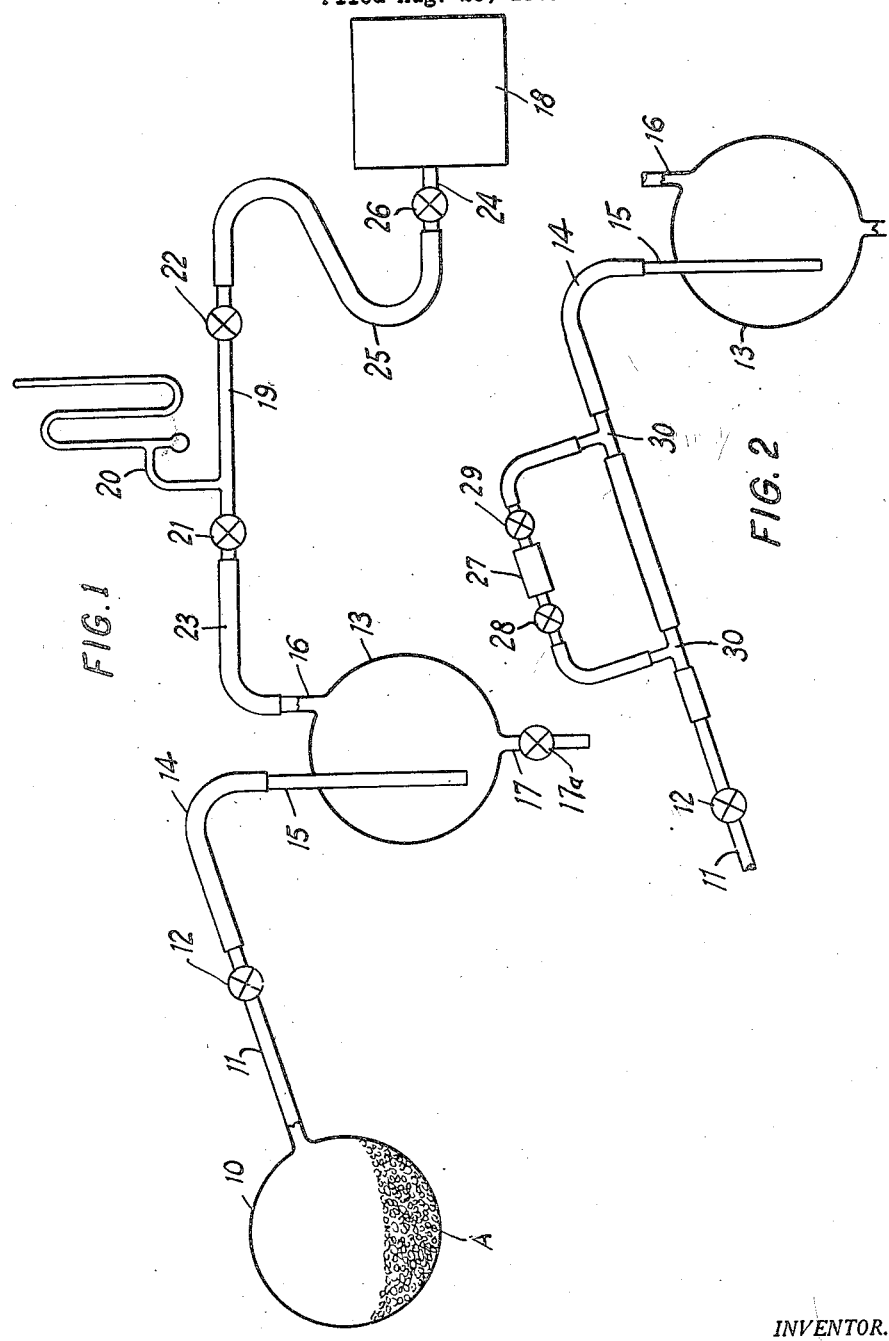

2,539,157

UNITED STATES PATENT OFFICE 2,539,157

METHOD OF TREATING FOOD PRODUCTS

Philip Page, Ridgewood, N. Y.

Application August 25, 1949, Serial No. 112,281

4 Claims. (Cl. 99—68)

This invention relates to a method of treating coffee and other food products in bean, kernel, seed or granular form. More particularly the invention concerns methods of heating or roasting coffee beans or the like.

In conventional coffee roasting practice, wherein the green coffee beans are roasted in receptacles open to the atmosphere, a substantial portion of the vaporizable constituents of the coffee are lost. Such practice results in a net loss in weight of the roasted beans of as much as 17% of the original weight of the green beans. In addition to the loss in weight, the final product is necessarily lacking at least a portion of the volatile oils, fats or the like, which give roasted coffee its body, aroma and flavor. Accordingly, an object of this invention is to provide a method of roasting coffee under predetermined pressure conditions whereby the loss in weight of the final product, due to roasting, is materially reduced and there is produced an improved end product.

Another object of this invention is to provide a method of the character described wherein coffee or other food products in granular, seed or kernel form, is heat treated in an enclosed receptacle under conditions of substantially reduced pressure, such treatment being accompanied by a distillation of vaporizable constituents of the treated product, wherein the recovered distillate, the heat treated residue or both may provide useful articles of commerce.

A further object of this invention is to provide a method of the character described which includes the heating and roasting of coffee beans or the like, under vacuum conditions wherein the vacuum system is such as permits an accurate determination of the progress of the roast.

Still another object of this invention is to provide a method of the character described which includes the roasting of coffee beans or the like in a closed system under materially reduced pressure, the distillation of vaporizable constituents of the coffee beans and the condensation of such vaporizable constituents.

Still a further object of this invention is to provide a combined method of roasting and distilling food products in seed, kernel or bean form in a vacuum system, wherein said system may be readily modified to insure an improved recovery of distillate or roasted residue, as selectively desired.

Yet another object of this invention is to provide an improved process of roasting and distilling coffee beans or the like, which effects economies in overall operation, provides improved products of commerce, eliminates obnoxious odors and the loss of valuable byproducts in vapor form and is practical and efficient to a high degree in use.

Other objects of this invention will in part be obvious and in part hereinafter pointed out.

The invention accordingly consists in the procedural steps which will be exemplified in the method hereinafter described, and of which the scope of invention will be indicated in the following claims.

In the accompanying drawing, in which is shown illustrative embodiments of the invention;

Fig. 1 is a diagrammatic representation of the method embodying the invention and Fig. 2 shows a modification of the system shown in Fig. 1.

Referring to the drawing, 10 designates a receiver or receptacle for the granular food product which is to be treated in accordance with the method of the invention. Such receptacle may take the form of a flask of heat resistant glass which includes an elongated neck portion 11. A valve 12 is positioned in the neck portion 11 adjacent the open end thereof. The open end of the neck 11 of flask 10 is connected to a condenser 13 by means of flexible tubing 14.

The condenser 13, which may be of glass or the like, is spherical in form and includes an inlet member 15, the outer projecting end of which receives one end of tubing 14. The inner end of member 15 terminates short of the bottom of condenser 13. The condenser also includes an outlet member 16 extending from the top thereof and a short tapping conduit 17 extending from the bottom thereof and provided with a valve 17a.

The outlet member 16 of the condenser is adapted to be connected to a high vacuum pump 18 by way of a tubing member 19. The member 19 has communicating with an intermediate portion thereof, a pressure gauge 20. The member 19 is provided on the opposite ends thereof with valves 21, 22. One end of member 19 is connected to the outlet member 16 of condenser 13 by means of a flexible tubing 23 while the other end thereof is connected to the inlet conduit 24 of pump 18 by flexible connection 25. The conduit 24 is provided with a valve 26 which is adapted to disconnect the pump from the member 19 and to open the pump to the atmosphere.

In practicing the method embodying the invention, the green coffee beans A are placed in the flask 10. The connections between the flask, the condenser and the pump are established, making sure that such connections are vacuum tight. The valves 12, 21, 22 and 26 are turned to provide through connection between the flask and the pump. Valve 17a is turned to its closed position. The pump 18 is operated to evacuate the air from the flask 10 and the connections thereto. The pump 18 is of the high vacuum type and is capable of reducing the pressure within the system to an order of about .001–.005 mm. of mercury. When the pump has been operated sufficiently long to produce the maximum vacuum, the flask 10 is subjected to rapid heating. The flask may be heated to a temperature of about 350°–500° F.

As the temperature of the contents of the flask rises, moisture is driven off therefrom in the form of vapor. Such vapor creates a back pressure within the system, as will be noted by the action of gauge 20. The valve 22 is turned to its off position while the valve 26 is turned to connect the pump to the atmosphere. The heating of the flask 10 is continued while the vapor formed condenses in the condenser 13. During the heating of the flask, various volatile constituents of the beans will be distilled off and also collected in the condenser 13. Meanwhile the beans will be quickly roasted under conditions of substantially reduced pressure.

The roasting period may be as little as 5 or 6 minutes at a maximum roasting temperature and from 10 to 15 minutes at a minimum temperature.

It has been found that the roasted bean exhibits a net loss in weight of approximately 9% in contrast with the loss of 17% in weight usual in conventional roasting procedures. Furthermore, the valve 17a may be opened to remove the condensate from condenser 13, which condensate provides valuable byproducts. Such condensate which represents approximately 8% by weight of the green bean, is capable of being separated by fractional distillation into various oils and the like, which have been found to be useful articles of commerce.

With a short roasting period and the vacuum conditions during the roast, it has been found that the roasted beans have a superior aroma, body and flavor, as compared to conventionally roasted beans. This may be due to a reduction in the net loss of volatiles and aromatics in the roasted bean.

The gauge 20, by its action during the roast, provides means for determining the progress of the roast, thus facilitating the roasting of beans having different moisture contents. It will also be noted that the color changes in the roasting bean may be corelated with the action of the gauge 20, thus affording a further index of the roasting action. The gauge 20 may be of the mercury column type which facilitates the reading thereof.

It is understood that other vegetable and food products in kernel, seed, bean or granular form, may be similarly treated to produce a roasted residue and a distilled condensate, either or both of which may form valuable articles of commerce. Thus, wheat, barley, oats, rye, corn, peas and pepper have been subjected to treatments embodying the invention. In the case of pepper, the condensate therefrom has proven to be highly desirable since it may be used as a seasoning by persons who cannot tolerate ordinary, ground pepper.

In the event that the distilled condensate which is collected in the condenser 13, is of primary consideration, the system shown in Fig. 1 may be modified as shown in Fig. 2. Here, the system shown in Fig. 1 is supplemented by an injector 27 or other device adapted to provide through suction. The injector 27, which includes an inlet valve 28 and an outlet valve 29, is connected in the line between flask 10 and condenser 13, by means of T connectors 30.

The system is initially operated as described hereinabove. When the formation of distillate starts, the pump 18 is disconnected from the system and the injector 27 is put into operation whereby to positively draw off the distilled vapors from the flask 10 into condenser 13. The heating temperature may be raised to a maximum in order to insure complete distillation. The condenser 13 may be arranged for water cooling to accelerate vapor condensation.

When the distillate is deemed of minor importance, the system may be operated without a condenser. In this case, roasting is conducted at minimum temperatures and over extended intervals of time.

While the instant invention has been illustrated as a batch procedure, it is understood that the invention may be readily embodied in a large scale, continuous operation. Thus, there may be provided an enclosed oven having a travelling conveyor as the bottom thereof. The oven may be suitably interconnected to condensing means and vacuum producing means. The material to be treated may be suitably introduced at one end of the oven while the roasted residue is continuously removed at the other end of the oven. The timed movement of the conveyor, particular vacuum conditions and details of condensation may be modified to suit the material being treated and the end products desired.

It will thus be seen that there is provided a method in which the several objects of this invention are achieved, and which is well adapted to meet the conditions of practical use.

As various possible embodiments might be made of the above described invention, and as various changes might be made in the embodiments above set forth, it is to be understood that all matter herein set forth is to be interpreted as illustrative and not in a limiting sense.

Having thus described my invention, I claim as new and desire to secure by Letters Patent:

1. The method of treating coffee beans comprising subjecting said beans within an enclosed system to an evacuating operation to initially reduce the pressure within said system to about .001 to .005 mm. of mercury, heating said beans to expel the moisture therefrom, collecting said moisture, distilling said beans to remove vaporizable constituents thereof, collecting said vaporizable constituents, said distilling temperature being about 350° to 500° F.

2. The method of treating coffee beans comprising placing said beans in an enclosed chamber, evacuating said chamber to a pressure of about .001 to .005 mm. of mercury, heating said chamber, stopping the evacuating operation and continuing the heating operation to roast said beans at a temperature of at least 350° F.

3. The method of treating coffee beans comprising placing said beans in an enclosed chamber, reducing the pressure within said chamber to about .001 to .005 mm. of mercury, applying heat at roasting temperature to said beans, continuously separating and condensing vaporizable constituents of said beans, the application of heat to said beans extending over a period of from about 5 to 15 minutes.

4. The method of treating vegetable material which comprises subjecting the material within an enclosed chamber to heat of at least 350° F. and a vacuum of about .001 to .005 mm. of mercury and removing vaporizable constituents of said material from said chamber.

PHILIP PAGE.

REFERENCES CITED

The following references are of record in the file of this patent:

UNITED STATES PATENTS

| Number | Name | Date |
| --- | --- | --- |
| 246,274 | Jennings | Aug. 23, 1881 |
| 1,426,001 | Reynolds | Aug. 15, 1922 |
| 1,603,189 | Bruning | Oct. 12, 1926 |
| 2,343,228 | Sperti | Feb. 29, 1944 |
| 2,444,217 | Armentrout | June 29, 1948 |

FOREIGN PATENTS

| Number | Country | Date |
| --- | --- | --- |
| 246,454 | Great Britain | of 1926 |